(12) United States Patent
Majer

(10) Patent No.: US 11,219,331 B2
(45) Date of Patent: Jan. 11, 2022

(54) APPARATUS FOR PREPARING AND DISPENSING BEVERAGES

(71) Applicant: RHEAVENDORS SERVICES S.p.A., Como CO (IT)

(72) Inventor: Carlo Doglioni Majer, Como CO (IT)

(73) Assignee: RHEAVENDORS SERVICES S.p.A.

( * ) Notice: Subject to any disclaimer, the term of this patent is extended or adjusted under 35 U.S.C. 154(b) by 250 days.

(21) Appl. No.: 16/098,146

(22) PCT Filed: Apr. 26, 2017

(86) PCT No.: PCT/IB2017/052392
§ 371 (c)(1),
(2) Date: Nov. 1, 2018

(87) PCT Pub. No.: WO2017/191529
PCT Pub. Date: Nov. 9, 2017

(65) Prior Publication Data
US 2019/0142211 A1  May 16, 2019

(30) Foreign Application Priority Data
May 3, 2016 (EP) ..................................... 16168199

(51) Int. Cl.
*A47J 31/44* (2006.01)
*A47J 31/56* (2006.01)
(Continued)

(52) U.S. Cl.
CPC ....... *A47J 31/4485* (2013.01); *A47J 31/4489* (2013.01); *A47J 31/4496* (2013.01);
(Continued)

(58) Field of Classification Search
CPC . A47J 31/4496; A47J 31/4485; A47J 31/4489
(Continued)

(56) References Cited

U.S. PATENT DOCUMENTS

| 5,509,349 A | 4/1996 | Anderson et al. |
| 6,040,564 A * | 3/2000 | Ueda .................... H05B 6/6479 |
| | | 219/682 |

(Continued)

FOREIGN PATENT DOCUMENTS

| CN | 202653927 | 1/2013 |
| DE | 102011102734 | 11/2012 |

(Continued)

OTHER PUBLICATIONS

International Search Report for corresponding Application No. PCT/IB2017/052392, dated Aug. 17, 2017. WO.
(Continued)

*Primary Examiner* — Reginald Alexander
(74) *Attorney, Agent, or Firm* — The Belles Group, P.C.

(57) ABSTRACT

An apparatus for preparing beverages comprises a water induction heater, a pump for feeding the water to the heater, a logic unit for controlling said heater and said pump, a device for heating and/or frothing milk, wherein said logic unit is configured for controlling the pump and the heater so that it is produced steam for heating and/or frothing the milk fed into said device.

10 Claims, 3 Drawing Sheets

(51) Int. Cl.
*A47J 31/52* (2006.01)
*A47J 31/46* (2006.01)
*H05B 6/10* (2006.01)

(52) U.S. Cl.
CPC .............. *A47J 31/468* (2018.08); *A47J 31/52* (2013.01); *A47J 31/56* (2013.01); *H05B 6/10* (2013.01)

(58) Field of Classification Search
USPC .................................................. 99/293, 323.1
See application file for complete search history.

(56) References Cited

U.S. PATENT DOCUMENTS

| | | | | |
|---|---|---|---|---|
| 7,600,467 | B2* | 10/2009 | Coccia | A47J 31/4485 |
| | | | | 99/293 |
| 9,381,473 | B2 | 7/2016 | Bonsch et al. | |
| 9,474,408 | B2* | 10/2016 | Dollner | A47J 31/4489 |
| 2007/0210075 | A1* | 9/2007 | Self | H05B 6/108 |
| | | | | 219/628 |
| 2008/0216665 | A1 | 9/2008 | Hoehne et al. | |
| 2010/0147158 | A1* | 6/2010 | Muller | A47J 31/461 |
| | | | | 99/300 |
| 2011/0070349 | A1* | 3/2011 | Burri | A47J 31/4485 |
| | | | | 426/474 |
| 2011/0232501 | A1* | 9/2011 | Kroesen | A47J 31/46 |
| | | | | 99/323.1 |
| 2012/0037145 | A1* | 2/2012 | Inoue | F22B 37/26 |
| | | | | 126/369 |
| 2014/0197554 | A1 | 7/2014 | Bönsch et al. | |
| 2016/0287010 | A1 | 10/2016 | Majer | |

FOREIGN PATENT DOCUMENTS

| | | |
|---|---|---|
| EP | 1967101 | 9/2008 |
| EP | 2868242 | 5/2015 |
| EP | 2881020 | 6/2015 |
| JP | 2014516679 | 7/2014 |
| TW | 200400806 | 1/2004 |
| TW | 201521653 | 6/2015 |
| WO | 2008139205 | 11/2008 |
| WO | 2015063572 | 5/2015 |
| WO | 2016034255 | 3/2016 |

OTHER PUBLICATIONS

Taiwanese Office Action and Search Report issued in Taiwanese Application No. 106113761 dated Aug. 6, 2020.
Russian Office Action issued in Russian Application No. 2018142262 dated Aug. 13, 2020.

* cited by examiner

APPARATUS FOR PREPARING AND DISPENSING BEVERAGES

FIELD OF THE INVENTION

The present invention concerns an apparatus for preparing and dispensing beverages. The invention is above all used in beverage dispensing apparatuses (such as for example HoReCa apparatuses), wherein the beverage preparation can provide for frothing the dairy milk, for example for preparing a cappuccino.

BACKGROUND ART

Apparatus for making and dispensing hot beverages (such as for example coffee, cappuccino, chocolate, tea, etc.) provided with devices for heating water, generally defined as boilers or kettles, are known.

In case wherein steam generation is provided, for example for frothing the milk, the apparatus is provided also with a two-phase boiler inside which there are hot water and pressurized steam. In this case, the apparatus is then provided with two separate boilers, a two-phase boiler dedicated for the steam dispensing, the other boiler being dedicated for dispensing hot water.

Generally, it is anyway necessary to maintain the water contained in the two-phase boiler at a desired temperature, also when the apparatus is not operating, so that to assure the preparing and dispensing of the beverage without long waiting times. Then, if the apparatus is not operative for a long time, there will be great energy consumption for maintaining the water at high temperatures.

In case of apparatuses provided with a two-phase boiler for dispensing steam and hot water, it is further necessary the presence of a control system (relief valves, pressure and/or temperature sensors connected to the boiler) in order to maintain temperature and pressure values inside the boiler in predetermined safety ranges.

Some apparatuses for preparing and dispensing beverages provide for frothing the milk automatically, i.e. without the need for the user of immersing a nozzle for dispensing the steam inside a jug in which the milk to be frothed has been previously poured. In particular, these apparatuses provide for the use of a mixing chamber inside which milk, steam and air are fed in such a way that frothed milk exiting from the mixing chamber is dispensed.

In order to correctly froth the milk, it is important that the steam flow introduced into the mixing chamber can be controlled (for example, so that it is maintained constant during the milk frothing), such that the repeatability of recipes, in which frothed milk dispensing is provided, can be guaranteed.

SUMMARY OF THE INVENTION

Object of the present invention is to solve the above mentioned problems and to provide an apparatus for preparing and dispensing beverages able to froth the milk automatically, which is economical and simple to implement and with reduced power consumption.

Further object of the present invention is to provide a method for preparing and dispensing beverages that allows frothing and/or heating the milk automatically, and with reduced power consumption.

Further object of the present invention is to provide a system able to heat water and generate steam rapidly and with reduced power consumption, that allows obtaining a correct steam dispensation for frothing the milk and is further able to dispense hot water for preparing different types of beverages.

These and other objects are solved by the present invention by an apparatus for preparing and dispensing beverages according to claim 1 and the respective dependent claims, a method for preparing and dispensing beverages, and a water heating system for generating steam.

In particular, the apparatus for preparing and dispensing beverages according to the present invention comprises supplying means to supply water to the apparatus (for example, they can comprise a tank and/or a duct for the hydraulic connection to the water main), a heater for heating the water, a pump for feeding water from the supplying means to the heater, a logic unit for controlling the heater and the pump, a device for heating and/or frothing the milk. Such a device in turn comprises a mixing chamber provided with a steam inlet hydraulically connected to the heater, means for feeding the milk into the mixing chamber and means for introducing air into the mixing chamber. The mixing chamber is preferably provided with an outlet for dispensing hot milk and/or frothed milk which may include a short duct or similar means to dispense the milk from the chamber.

According to an aspect of the present invention, the heater is an electromagnetic induction heater, and the logic unit is configured for controlling the pump and the heater so that to produce hot water or steam by means of the same single heater. The apparatus further comprises means for feeding the steam into the mixing chamber and means for feeding hot water to the respective devices for preparing a beverage; examples of such devices are an infusion chamber for preparing coffee, e.g., and mixing assemblies for powdered soluble products. Advantageously, the apparatus comprises only one heater, several devices for preparing the beverage from hot water and at least one device using the steam, preferably a chamber for mixing steam, air and milk.

Thanks to the present invention it is then possible to produce steam by activating the heater only for the time necessary for preparing a beverage, without the need of maintaining hot water and steam under pressure in a boiler for an undetermined time period. Such a solution allows reducing the electric power consumption, above all in case wherein the apparatus alternates long inactivity periods.

Advantageously, the heater comprises a metal duct adapted to be heated by electromagnetic induction, and at least one electromagnetic induction winding whose coils are arranged around the metal duct. Preferably, the metal duct has a substantially tubular shape, comprising a water inlet and a steam outlet and being configured so that the change of state from water to steam occurs along the path defined by the metal duct. Such a feature allows producing a steam flow with adjustable flow rate (for example constant) ideal for frothing the milk automatically. More preferably, the metal duct is made in the shape of spiral (for example a cylindrical spiral, i.e. a helicoid duct) so that to maximize the space, thus maximizing the water volume that can be introduced inside the heater.

According to an aspect of the present invention, the apparatus comprises means for detecting the water temperature upstream and, preferably, downstream of the heater with respect to the water flow. In this way it is possible to adjust the electric power provided by the heater, depending on the temperature of the water contained in the tank.

Advantageously, the mixing chamber comprises a Venturi hydraulically connected to the heater for receiving the steam from the steam inlet of the mixing chamber. The means for feeding the milk into the mixing chamber comprise a milk duct hydraulically connected to the Venturi. This embodiment allows a simple and quick sanitization of the device for heating and/or frothing the milk.

Preferably, the means for feeding the milk into the mixing chamber comprise, in addition to the Venturi, a milk pump configured to feed the milk from a milk tank towards the mixing chamber.

Preferably, the means for introducing air into said mixing chamber comprise a valve for adjusting the air flow introduced in the mixing chamber.

Further object of the present invention is a method for preparing and dispensing beverages by means of an apparatus according to any one of the above mentioned features. The method comprises the steps of:

a) feeding water into a heater by means of a pump;
b) heating the water fed into the heater to produce steam;
c) feeding the steam produced in the step b) into a mixing chamber;
d) feeding milk into said mixing chamber, for example by means of a milk pump or by depression feed (through Venturi effect);
e) feeding air into the mixing chamber when a milk frothing is required;

The method is characterized in that the step b) is carried out by means of an electromagnetic induction heater and in comprising a step of f) controlling the pump and the heater so that it is produced steam usable for heating and/or frothing the milk fed into the mixing chamber.

In this way the apparatus can dispense hot milk or frothed milk automatically and with reduced power consumption. By controlling the air introduction it is therefore possible to adjust the milk frothing reproducibly and reliably.

According to an aspect of the present invention, the method comprises a step of a1) detecting the water temperature upstream of the heater with respect to the water flow and a step of a2) adjusting the power of the heater depending on the water temperature value detected in the step a1). Such a feature allows optimizing the heater power consumptions. For example, depending on the temperature of the outer environment (geographic position and year period), the water contained in the tank or coming from the water main could undergo temperature variations.

Advantageously, the step d) is carried out by means of a Venturi. Alternatively, the step d) is carried out by means of a milk pump. In a preferred embodiment of the method, the step d) is carried out by means of the combined action of the Venturi and the milk pump. The Venturi allows obtaining an optimal mixing of air, milk and steam, whereas the pump stabilizes the milk flow rate, thus improving the reproducibility of the dispensed beverage.

According to an aspect of the present invention, the step b) is carried out by means of a substantially tubular metal duct heated by electromagnetic induction, and wherein the change of state from water to steam occurs along the metal duct. Such a feature, as previously explained, allows obtaining a stable control of steam flow even in long steam dispensations.

Further object of the present invention is a water heating system for generating steam for beverage dispensing apparatuses, comprising supplying means to supply water to the system (for example, they can comprise a water tank and/or a duct for the hydraulic connection to the water main), a heater for heating the water, a pump for feeding water from the tank to the heater, a logic unit for controlling the heater and the pump. According to a peculiar aspect of the present invention, the heater is an electromagnetic induction heater comprising a substantially tubular metal duct adapted to be heated by electromagnetic induction. The metal duct (preferably made in the shape of spiral) is provided with a water inlet and only one outlet for steam or hot water.

The system further comprises at least one dispensing valve hydraulically connected to the outlet of the metal duct of the heater, for dispensing hot water or steam. The logic unit is configured to control the pump and the heater for dispensing hot water or steam from the heater.

Preferably, the system comprises a plurality of valves for dispensing hot water and at least one valve for dispensing steam to a device for heating and/or frothing milk. Such a system allows generating steam or hot water by means of only one heater, thus allowing implementing apparatuses for preparing and dispensing beverages of modular type. Different devices for preparing beverages (for example a coffee infusion assembly, mixers for soluble products, etc.) can be therefore hydraulically connected to the dispensing valve/s and fed by only one heater. Such a system simplifies the implementation of the apparatus, allowing the connection and disconnection of different devices for preparing beverages to/from the heater based on the request of the end user.

BRIEF DESCRIPTION OF THE DRAWINGS

Further aspects and advantages of the present invention will be more evident from the following description, made for illustration purposes only and without limitation, referring to the accompanying schematic drawings, in which.

EMBODIMENTS OF THE INVENTION

Figure 1:
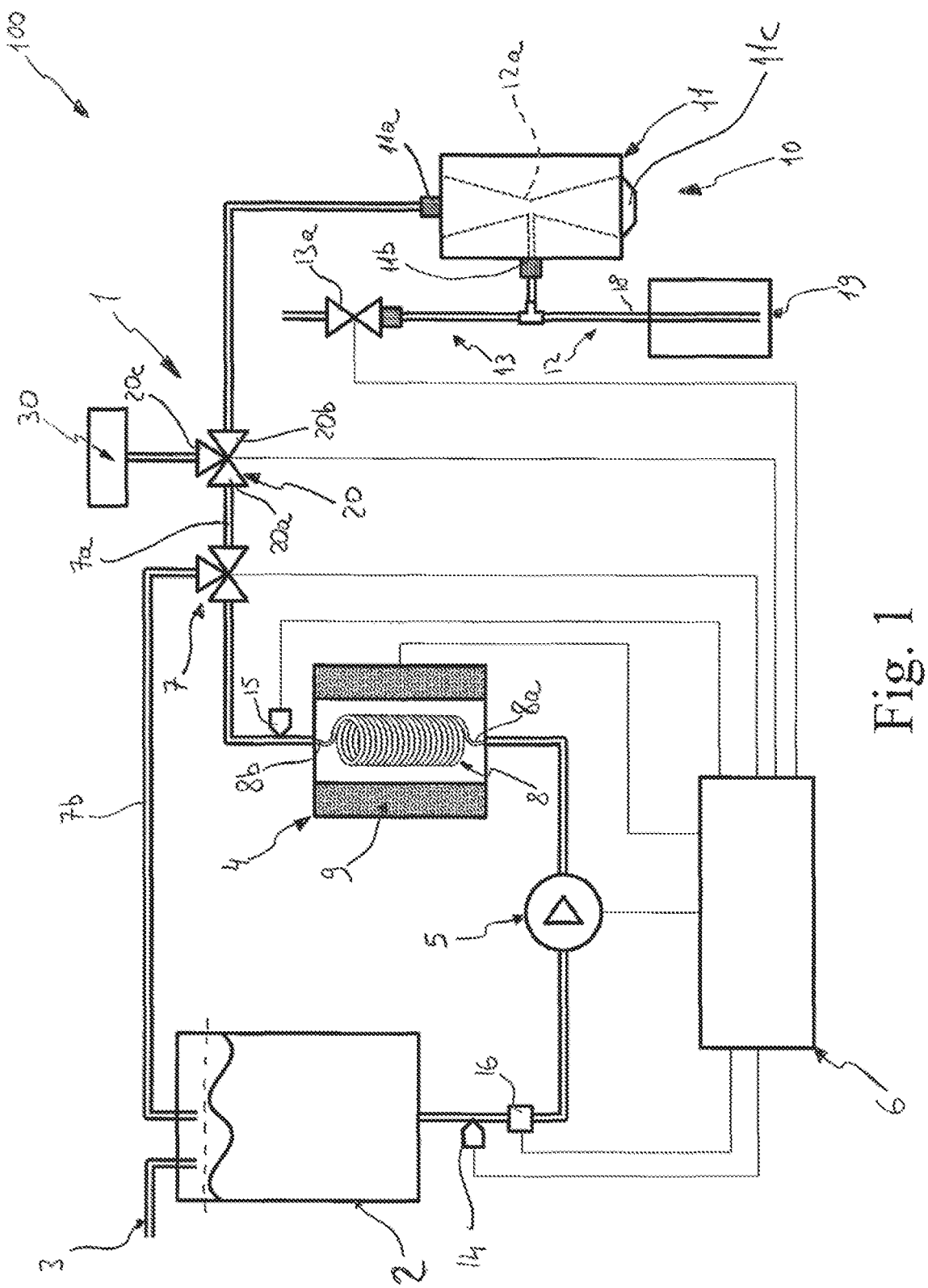
FIG. 1 is a schematic view of a particular embodiment of the apparatus according to the present invention.

In FIG. 1, an apparatus 100 for preparing beverages according to a first embodiment of the present invention is schematically shown. The apparatus 100 comprises a water tank 2, that can be for example a so-called "air-break" tank, i.e. a tank (typically present in apparatuses directly connected to the water main) filled up to a certain level, such that an air layer adapted to separate the water main 3 from the hydraulic circuit of the apparatus 100 is formed, in order to avoid possible bacteria or microorganisms present inside the hydraulic circuit of the apparatus 100 from polluting the whole water main 3.

The apparatus 100 further comprises a heater 4 for heating the water, a pump 5 for feeding the water from the tank 2 to the heater 4, and a logic unit 6 for controlling the pump 5 and the heater 4.

The logic unit 6 is configured to control the pump 5 and the heater 4 so that steam is produced. In particular, the heater 4 is an electromagnetic induction heater, preferably comprising a metal duct 8 comprising a water inlet 8a and an outlet 8b of settable temperature hot water or steam. The heater 4 comprises at least one electromagnetic induction winding 9 whose coils are wound around a metal duct 8 so that the metal duct 8 can be heated by electromagnetic induction. More preferably, the metal duct 8 has a substantially tubular shape and is configured so that the change of state from water to steam occurs along the metal duct between the water inlet 8a and the steam outlet 8b.

In the embodiment shown in FIG. 1, the metal duct 8 is made in the spiral shape, but additional embodiments of the present invention can provide the metal duct 8 for being made substantially in a U shape, straight, or in other shape, still remaining in the protection scope of the present invention. The coils of the electromagnetic induction winding 9 can be made, for example, by winding an electric cable (enameled or provided with insulating sheath) around the metal duct 8, in a way known per se in the art. The coils can be wound directly around the metal duct 8 or around a spool (not shown) made of electrically insulating material and provided with a cavity inside which the metal duct 8 is housed. In the latter case, a preferred embodiment of the present invention provides for the apparatus 100 comprising an electromagnetic induction heater 4 of the type described in the Application EP 2868242 in the name of the same Applicant.

In particular the Applicant noticed that, by adjusting the water flow rate delivered by the pump 5 and the power of the electromagnetic induction heater 4, it is possible to generate a steam flow whose flow rate can be precisely and reliably controlled. In particular, the Applicant noticed that the particular tubular shape of the metal duct 8 allows obtaining stable control of the steam flow also for long steam dispensations. Moreover, the change of state from water to steam occurs at ambient pressure, therefore without the need of sophisticated and expensive safety systems on the contrary necessary for heaters in which there is a two-phase boiler. In other words, the water fed inside the metal duct 8, by contacting the inner walls of the duct 8, is heated more and more during the path towards the outlet 8b of the heater 4. Along such a path the change of state from water to steam occurs, therefore a portion of the duct 8 at the inlet 8a will be filled with water, whereas a portion of duct 8 at the outlet 8b will be filled with steam, as the water is pumped inside the duct 8.

The apparatus 100 further comprises a device 10 for heating and/or frothing the milk, comprising a mixing chamber 11 provided with a steam inlet 11a hydraulically connected to said heater 4 and a milk inlet 11b. The device 10 further comprises means 12 for feeding the milk into the mixing chamber 11 and means 13 for introducing air into the mixing chamber 11. The apparatus 100 comprises means for feeding the steam to the mixing chamber 11, which comprise at least one duct 7a for hydraulically connecting the outlet of the heater 4 to the steam inlet 11a of the device 10.

In the embodiment of FIG. 1, the outlet of the heater 4 (i.e. the outlet 8b of the metal duct 8) is preferably hydraulically connected to a recirculation valve 7 (for example a three-way valve) configured to selectively divert the flow of hot water from the outlet of the heater 4 to an outlet duct 7a or to the tank 2 by means of a recirculation duct 7b. Alternatively additional embodiments can provide, for example, the use of a T-joint with two two-way valves in place of the three-way valve 7. In this way it is possible to carry out one or more pre-heating cycles of the water contained in the tank 2 before dispensing the steam from the outlet duct 7a. Further embodiments can anyway provide for the outlet 8b of the metal duct 8 being directly and hydraulically connected to the outlet duct 7a and for the recirculation valve 7 (if present) being arranged downstream of the device 10 for heating and/or frothing the milk, still remaining in the protection scope of the present invention. Referring to FIG. 1, the means 12 for feeding the milk into the mixing chamber 11 comprise a Venturi 12a (shown in dotted line). Particularly, the mixing chamber 11 comprises a Venturi 12a hydraulically connected to the heater 4 for receiving the steam from the steam inlet 11a of the mixing chamber 11. The means 12 for feeding the milk into the mixing chamber further comprise a milk duct 18 hydraulically connected to the Venturi 12a. The Venturi 12a is then hydraulically connected to the milk inlet 11b of the mixing chamber 11, the milk inlet being hydraulically connected to a milk tank 19 (preferably a cooled one, for example in case the tank 19 contains dairy milk) through the duct 18.

By feeding steam to the inlet 11a of the mixing chamber, the milk is suctioned by Venturi effect from the tank 19 and fed into the mixing chamber 11, inside which the milk is steam-heated. Preferably, the means 13 for introducing air into the mixing chamber 11 comprise a valve 13a for adjusting the air flow introduced in the mixing chamber 11.

By keeping the valve 13a closed, the air introduction into the mixing chamber is avoided and the milk dispensed from the outlet 11c is heated only by steam. By opening the valve 13a, the air is allowed entering the mixing chamber. In this way the milk, by mixing together steam and air, is frothed and dispensed from the outlet 11c. By adjusting the amount of air introduced in the mixing chamber, the milk will be frothed to the desired extent and with bubbles of the froth having the desired size. Also if in FIG. 1 the means 13 for introducing air into the mixing chamber 11 comprise a duct hydraulically connecting the milk inlet 11b with the air of the outer environment, further embodiment can provide for the mixing chamber being equipped with distinct air and milk inlets, still remaining in the protection scope of the present invention.

The mixing chamber 11 can be advantageously disconnected from the apparatus 100 by means of quick-couplings known per se in the art. The duct hydraulically connecting the mixing chamber 11 to the tank 19 can be advantageously disconnected from the inlet 11b. In this way an operator can every day change the mixing chamber and the milk duct simply and quickly, without the need of carrying out a long cleaning cycle of the apparatus. The mixing chamber, i.e. the Venturi, can be preferably disassembled and washed once disassembled.

Figure 2:
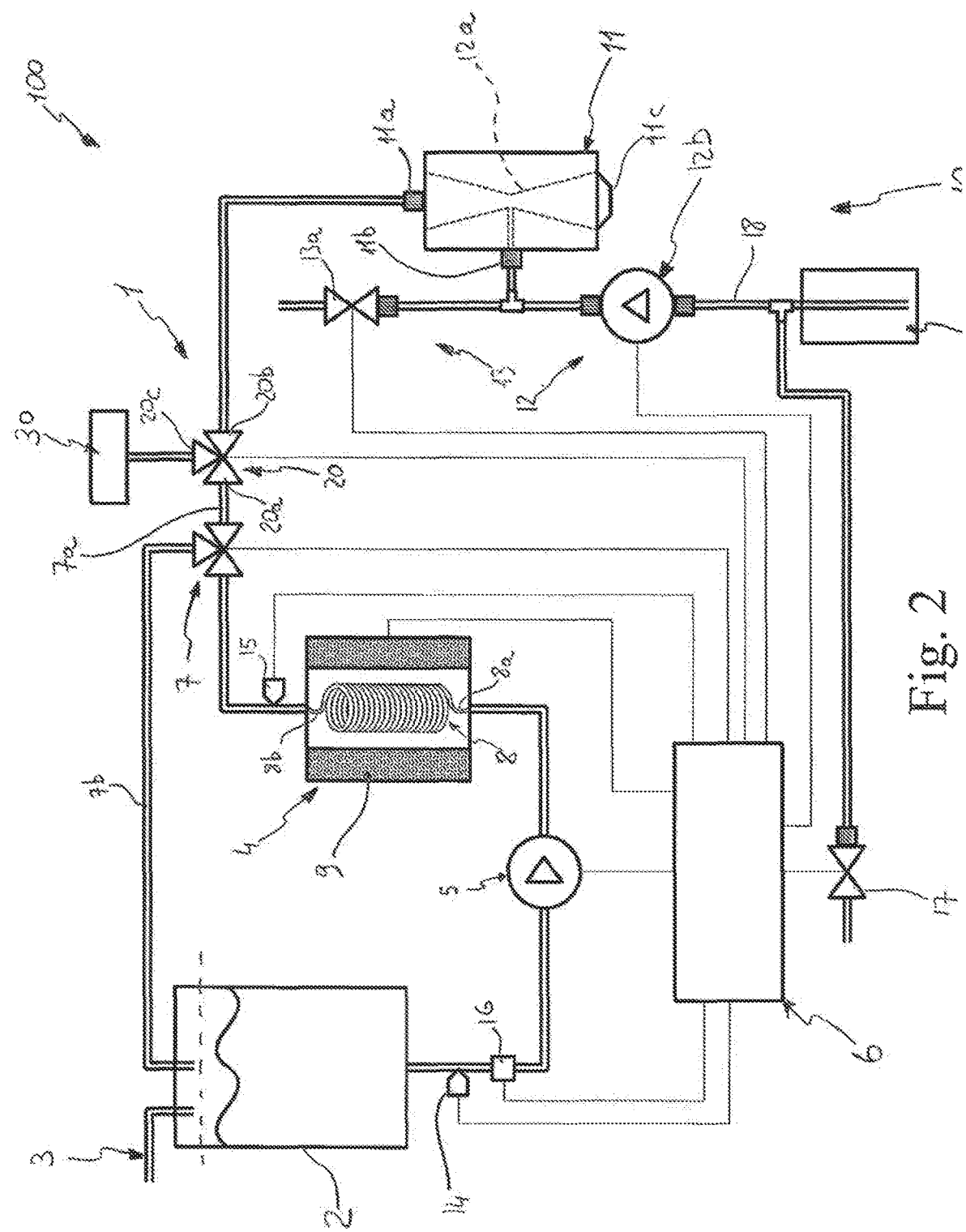
FIG. 2 is a schematic view of another embodiment of the apparatus according to the present invention.

In FIG. 2 a schematic view of another embodiment of the apparatus 100 according to the present invention is shown. In this embodiment, the means 12 for feeding the milk into the mixing chamber 11 comprise a milk pump 12b configured to feed the milk from a milk tank 19 towards the mixing chamber 11. The milk pump 12b (that is preferably a gear pump) is controlled by the logic unit 6 to feed the milk into the mixing chamber with a given flow rate.

In this way it is possible to improve the reproducibility of the milk frothing rate with respect to the embodiment wherein the milk feed into the mixing chamber occurs by Venturi effect. Preferably, also in this embodiment a Venturi 12a could be used in the mixing chamber 11 to improve the milk mixing with steam and air. In this way, the apparatus 100 can further dispense cold milk too by means of the milk pump 12b, keeping the valve 13a closed and without activating the heater 4 and the pump 5.

In this embodiment, the apparatus 100 further comprises a vent valve 17 controlled by the logic unit 6. The vent valve 17 is kept closed during the activation of the milk pump 12b. When the pump 12b is stopped, as the milk dispensation is stopped, the logic unit 6 controls the opening of the valve 17 in order to empty the milk duct 18 hydraulically connecting the milk pump 12b to the tank 19.

The logic unit 6 is further configured to control the pump and the heater so that to dispense also hot water at the outlet 8b of the metal duct 8. In particular, the logic unit 6 can be advantageously configured to adjust the flow rate of the pump 5 and the electric power of the electromagnetic induction heater 4 in accordance with a plurality of heating programs stored in the memory. For example, a first heating program can provide for the steam dispensing by setting the flow rate of the water fed by the pump 5 at a constant value of about 1 cc/sec and supplying the electromagnetic induction heater by a power of about 3 kW. Additional heating programs can provide for higher flow rates and/or water temperatures lower than 100° C. For example, for preparing beverages obtainable by dissolution of soluble products, a heating program performed by the logic unit 6 can provide for a flow rate of hot water of about 10 cc/sec and a heater power of about 3 kW so that to dispense hot water at 85° C. From this basis, the apparatus 100 according to the present invention can comprise a water heating system for generating steam, denoted in FIG. 1 and FIG. 2 with the numeral reference 1.

The system 1 comprises the heater 4, the pump 5, the tank 2, the logic unit 6 and at least one dispensing valve 20. The dispensing valve is preferably a three-way valve 20 comprising an inlet way 20a hydraulically connected to the outlet duct 7a, a first outlet way 20b for dispensing the steam and a second outlet way 20c for dispensing hot water.

The logic unit 6 is configured to control the pump 5, the heater 4 and the three-way valve 20 for dispensing steam from the first outlet way 20b or for dispensing hot water from the second outlet way 20c.

Therefore, in the embodiments shown in FIG. 1 and FIG. 2, the system 1 can be denoted as anything being upstream of the first and second outlet way 20b, 20c with respect to the water flow.

The first outlet way 20b is configured to be hydraulically connected to the steam inlet 11a of the device 10 for heating and/or frothing the milk, whereas the second outlet way 20c is configured to be hydraulically connected to one or more devices 30 for preparing beverages, such as for example at least one infusion assembly for preparing coffees, at least one spout for dispensing hot water (e.g. for the tea), at least one mixing assembly for preparing beverages from soluble products, etc.

Figure 3:
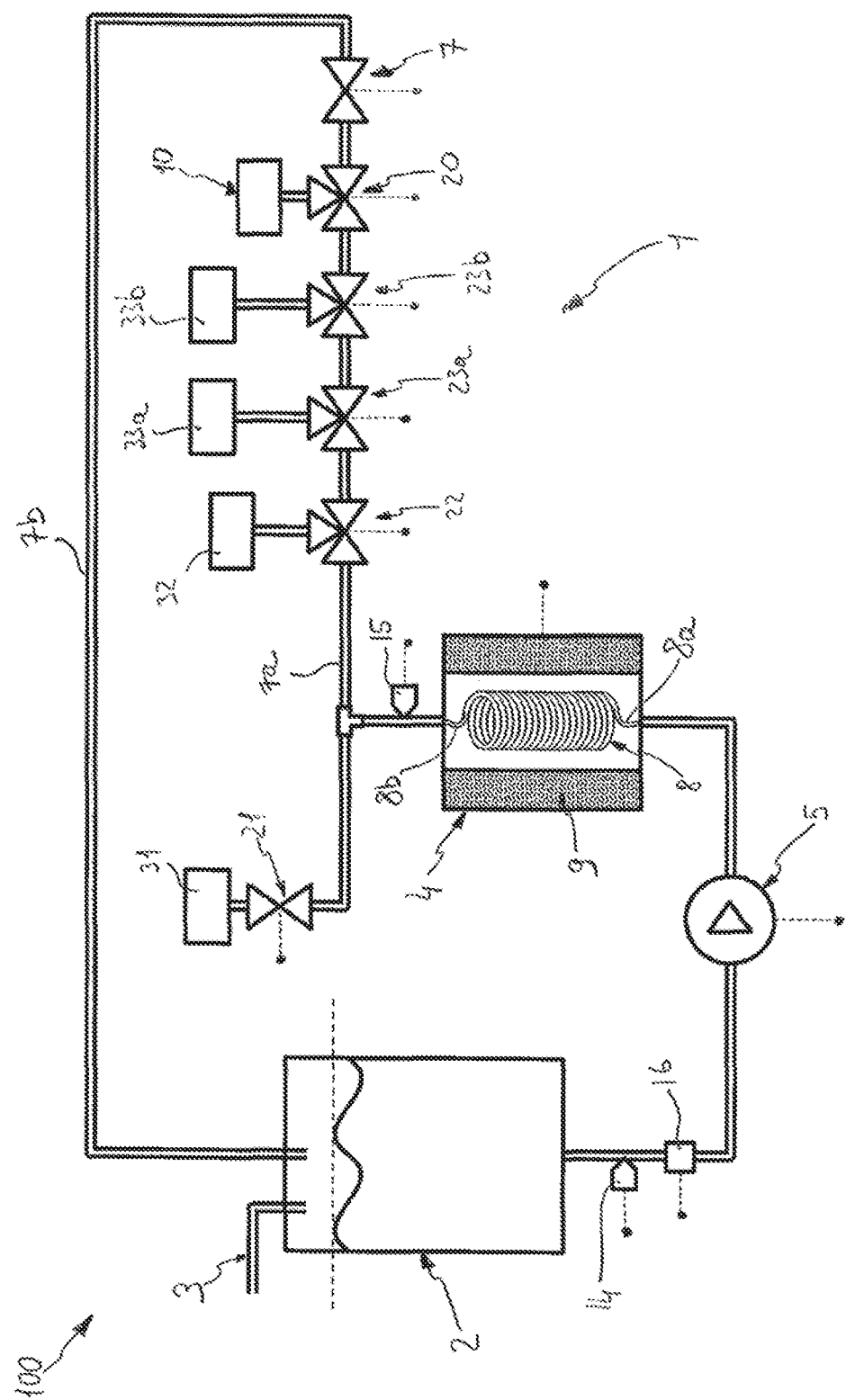
FIG. 3 is a schematic view of another preferred embodiment of the apparatus according to the present invention.

In FIG. 3 a preferred embodiment of the apparatus 100 according to the present invention is shown. For clarity purposes, the logic unit 6 and the respective electric connections with the elements of the apparatus 100 have been omitted from FIG. 3. In this embodiment, the heating system for generating steam comprises a plurality of valves 21, 22, 23a, 23b for dispensing hot water and a valve 20 for dispensing steam. In particular, the embodiment shown in FIG. 3 provides a T-joint hydraulically connected to the outlet 8a of the heater 4. A branch of the T-joint is connected to an infusion assembly 31 for preparing espresso by means of a dispensing valve 21. The other branch of the T-joint is connected to the outlet duct 7a, in which three hot water dispensing valve 22, 23a, 23b, a valve 20 for dispensing steam and a recirculation valve 7 are connected in series.

The dispensing valve 22 (preferably a three-way valve) is hydraulically connected to a spout for dispensing hot water, preferably for preparing tea. The valves 23a, 23b (preferably three-way valves) are hydraulically connected to two mixing assemblies 33a, 33b for preparing beverages from soluble products. The valve 20 (preferably a three-way valve) is hydraulically connected to the device 10 for heating and/or frothing the milk. The recirculation valve 7 is hydraulically connected to the duct 7b for recirculating the water towards the tank 2.

Therefore, in order to feed hot water to the infusion assembly 31, the valve 22 is kept closed and the valve 21 open. To feed steam to the device 10 for heating and/or frothing the milk, the valve 21 and the valve 7 are kept closed, whereas the valves 22, 23a, 23b arranged between the heater outlet 8b and the valve 20 are kept open to allow the steam passing between the outlet 8b and the valve 20, further avoiding the steam from being dispensed towards the respective devices 32, 33a, 33b. Analogously, to feed hot water to one of the devices 32, 33a, 33b, for example the device 33a, the valve 21 is kept closed together with the valve 23b just downstream of the valve 23a with respect to the water flow. The valve 23a and the valves arranged between the valve 23a and the outlet 8b of the heater (in this case only the valve 22) are therefore kept open to allow hot water passing from the outlet 8b of the heater 4 to the device 33a.

The water heating system 1 for generating steam according to the present invention allows implementing simply and cheaply a modular apparatus 100 for preparing and dispensing beverage, i.e. an apparatus comprising a single electromagnetic induction heater 4 through which hot water or steam can be fed to different device types 10, 30, 31, 32, 33a, 33b, which can be hydraulically connected or disconnected to/from the heater 4.

Referring to FIGS. 1-3, the apparatus 100 preferably comprises means 14 for detecting the water temperature upstream of the heater 4 with respect to the water flow. Preferably, the logic unit 6 detects the water temperature upstream of the heater with respect to the water flow and consequently adjusts the power of the heater 4 depending on such a temperature value. In particular in the embodiment shown in FIG. 1, the means 14 for detecting the water temperature upstream of the heater 4 with respect to the water flow comprise at least one thermocouple arranged on the duct hydraulically connecting the tank 2 to the pump 5. Further embodiments can provide for the means detecting the water temperature upstream of the heater 4 for being arranged at the inlet 8a of the heater 4 and/or inside the tank 2, preferably on the bottom of the tank 2, still remaining in the protection scope of the present invention.

Preferably, the apparatus 100 comprises means 15 for detecting the water temperature downstream of the heater 4 with respect to the water flow. These means 15 can for example comprise at least one thermocouple arranged at the outlet 8b of the heater 4 and/or on the outlet duct 7a. In this way a closed-loop control can be carried out on the temperature of water or steam exiting from the heater 4.

Preferably, the apparatus 100 comprises means 16 for detecting the flow rate of the water fed by the pump 5 into the heater 4. For example, the means 16 comprise at least one displacement meter preferably arranged on the duct hydraulically connecting the pump 5 to the tank 2. By means of the displacement meter, the logic unit 6 controls the pump 5 so that a desired amount of water can be fed precisely into the heater 4.

The main steps of preparing and dispensing a beverage by means of the apparatus 100 according to the present invention will be now stated:
a) feeding water into the heater 4 by means of a pump 5;
b) heating the water fed into the heater 4 to produce steam;
c) feeding the steam produced in step b) into the mixing chamber 11;
d) feeding milk into the mixing chamber 11, preferably by means of a Venturi and/or by means of the milk pump 12b;
e) controlling the air introduction into the mixing chamber by means of a valve 13a;

f) controlling the pump 5 and the heater 4 so that, during step c), the milk fed into the mixing chamber 11 is heated and/or frothed.

Preferably, the water temperature upstream of the heater with respect to the water flow is determined in a step a1). Therefore, in a step a2) the power of the heater 4 is adjusted depending on the temperature value determined in the a1). In case wherein the water coming from the water main 3 is very cold or if the apparatus 100 has not been used for long time, one or more pre-heating cycles can be carried out (by means of the duct 7*b*) and/or the power of the heater 4 and the flow rate of the pump 5 can both be adjusted, in order to guarantee the correct steam dispensing for heating and/or frothing the milk.

The invention claimed is:

1. An apparatus for preparing and dispensing beverages, comprising:
   supplying means to supply water to said apparatus;
   a heater for heating the water;
   a pump for feeding water from said supplying means to said heater;
   a logic unit for controlling said heater and said pump;
   a milk heating and/or frothing device comprising a mixing chamber provided with a steam inlet hydraulically connected to said heater, means for feeding milk into said mixing chamber and means for introducing air into said mixing chamber;
   an outlet duct hydraulically connecting said steam inlet of said mixing chamber of said milk heating and/or frothing device to an outlet of said heater;
   a beverage preparation device;
   a dispensing valve located along the outlet duct, the dispensing valve comprising a first outlet way providing a fluid passageway from the heater to the milk heating and/or frothing device and a second outlet way providing a fluid passageway from the heater to the beverage preparation device;
   wherein said heater is an electromagnetic induction heater comprising a metal duct adapted to be heated by electromagnetic induction and at least one electromagnetic induction winding whose coils are arranged around said metal duct;
   wherein the logic unit is configured to control the pump and the heater so that hot water and steam can be produced within the metal duct, and further comprising means for feeding said steam to said mixing chamber; and
   wherein the logic unit is further configured to control the dispensing valve so that the steam produced within the metal duct is dispensed from the first outlet way of the dispensing valve to the milk heating and/or frothing device and the hot water produced within the metal duct is dispensed from the second outlet way of the dispensing valve to the beverage preparation device.

2. The apparatus according to claim 1, wherein said means for supplying water to said apparatus comprise a tank.

3. The apparatus according to claim 1, wherein said metal duct has a substantially tubular shape and is configured so that a change of state from water to steam occurs along said metal duct.

4. The apparatus according to claim 1, wherein said metal duct is made in a spiral shape.

5. The apparatus according to claim 1, comprising means for detecting a temperature of the water upstream of said heater with respect to a flow direction of the water.

6. The apparatus according to claim 1, wherein said mixing chamber comprises an outlet for dispensing hot milk and/or frothed milk.

7. The apparatus according to claim 1, wherein said mixing chamber comprises a Venturi hydraulically connected to said heater to receive the steam from said steam inlet, said means for feeding the milk into said mixing chamber comprising a milk duct hydraulically connected to said Venturi.

8. The apparatus according to claim 1, wherein said means for feeding the milk into said mixing chamber comprise a milk pump configured to feed the milk from a milk tank towards said mixing chamber.

9. The apparatus according to claim 1, wherein said means for introducing air into said mixing chamber comprise a valve for adjusting the air flow introduced in said mixing chamber.

10. The apparatus according to claim 1, wherein the outlet duct and the means for introducing air into the mixing chamber are not hydraulically coupled together upstream of the milk heating and/or frothing device.

* * * * *